US006832233B2

(12) United States Patent
Umeno

(10) Patent No.: US 6,832,233 B2
(45) Date of Patent: Dec. 14, 2004

(54) APPARATUS AND METHOD FOR COMPUTING MULTIPLE INTEGRAL, AND RECORDING MEDIUM

(75) Inventor: Ken Umeno, c/o Communications Research Laboratory, Ministry of Posts and Telecommunications, 2-1, Nukuikitamachi 4-chome, Koganei-shi, Tokyo 184-8795 (JP)

(73) Assignees: Communications Research Laboratory, Ministry of Posts and Telecommunications, Tokyo (JP); Ken Umeno, Tokyo (JP)

(*) Notice: Subject to any disclaimer, the term of this patent is extended or adjusted under 35 U.S.C. 154(b) by 629 days.

(21) Appl. No.: 09/746,139

(22) Filed: Dec. 22, 2000

(65) Prior Publication Data

US 2001/0005851 A1 Jun. 28, 2001

(30) Foreign Application Priority Data

Dec. 27, 1999 (JP) ............................................. 11-370277

(51) Int. Cl.$^7$ ................................................. G06F 7/38
(52) U.S. Cl. ....................................................... 708/444
(58) Field of Search ................................. 708/443, 444

(56) References Cited

U.S. PATENT DOCUMENTS

| | | | | | |
|---|---|---|---|---|---|
| 5,313,469 | A | * | 5/1994 | Adham et al. | ............... 714/724 |
| 5,790,442 | A | * | 8/1998 | Ninomiya et al. | ........... 708/444 |
| 6,304,888 | B1 | * | 10/2001 | Mizuta | ........................ 708/444 |

FOREIGN PATENT DOCUMENTS

| | | |
|---|---|---|
| JP | H10-283344 | 10/1998 |
| JP | H11-259452 | 9/1999 |

OTHER PUBLICATIONS

R. L. Adler et al., "Ergodic and mixing properties of Chebyshev polynomials," *Proc. Am. Math. Soc.* 15:794–796 (1964).

R. N. Mantegna et al., "Scaling behaviour in the dynamics of an economic index," *Nature*, 376:46–49 (1995).

S. M. Ulam et al., "On quasi–fixed points for transformation in function spaces," *Am. Math. Soc.* 53:1120 (1947).

Umeno, "Chaotic Monte Carlo Computation: A Dynamical Effect of Random–Number Generations," *Japanese Journal of Applied Physics* 29:1442–1456 (2000).

Umeno, "Method of constructing exactly solvable chaos," *Physical Review E*, 55(5):5280–5284 (1997).

Umeno, "Superposition of chaotic processes with convergence to Levy's stable law," *Physical Review E*, 58(2):2644–2647 (1998).

Kenji Nakagawa, "Importance Sampling Simulation and Its Application", Systems/Control/Information, The Institute of Systems, Control and Information Engineers, Mar. 15, 1999 43(3):7–12.

Ken Umeno, "Superposition of Chaotic Processes with Convergence to Levy's Stable Law", Physical Review E, The American Physical Society, Aug. 1999, 58(2):2644–2647.

* cited by examiner

*Primary Examiner*—Chuong Dinh Ngo
(74) *Attorney, Agent, or Firm*—Luce, Forward, Hamilton & Scripps LLP

(57) ABSTRACT

When numerically integrating an integrand function A over an unbounded domain, a vector map f converts an m (m≧1)-dimensional vector into an m-dimensional vector wherein a multidimensional density function ρ of the limiting distribution resulting from repeatedly applying the map f to a predetermined m-dimensional vector u is analytically solvable. A first storage unit stores an m-dimensional vector x, a second storage unit stores a scalar value w, a first computing unit computes a vector x'=f(x), a second computing unit computes a scalar value w'=A(x)/ρ(x), an update unit updates values in the first and second storage units and by storing the vector x' on the first storage unit and adding the scalar value w' to a value to be stored in the second storage unit, and an output unit computes a scalar value s=w/(c+1) when the number of update times by the update unit becomes c (c≧1) and outputs the result.

31 Claims, 10 Drawing Sheets

$c1 < c2 < C$

APPARATUS AND METHOD FOR COMPUTING MULTIPLE INTEGRAL, AND RECORDING MEDIUM

BACKGROUND OF THE INVENTION

1. Field of the Invention

The present invention relates to an apparatus and method for computing multiple integral, and a recording medium. More particularly, to an apparatus and method for high speed multidimensional integration of given integrand functions which are defined over a multi-dimensional unbounded domain, and a recording medium in which a program for realizing the apparatus and the method for computing multiple integral.

2. Description of the Related Art

Problems relating to computation of multiple integral on a multi-dimensional unbounded domain appear in various technical fields such as risk evaluation in financial derivative calculation, evaluating interference noises in multiple-user communication systems such as CDMA (Code Division Multiple Access), and the like.

In case of numerical integration on 1- or 2-dimensional domain, the domain (interval) can be divided into fine subdomains, and an approximated integral can be obtained as an average of represented values of an integrand function on each subdomain.

If the integration domain is in higher dimension, however, the domain must be divided into the great number of subdomains. The number of the subdomains must exponentially increase with respect to the dimensionality of the integration domain to maintain the commutative efficiency. This problem is called "curse of dimensionality".

Monte Carlo method has been proposed as one of solutions for such the problems. Monte Carlo method usually employs pseudo-random numbers (including quasi random numbers such as low-discrepancy sequences) on the finite interval which should be uniformed as possible.

In a case where integral must be defined in an unbounded domain such as infinite domain $[-\infty, +\infty]$, however, it is impossible to normalize uniformed random numbers on a bounded domain after converting the uniformed random numbers on the finite interval into uniformed random numbers on the unbounded domain by a linear transformation. In this case, a useful non-linear change of variables is required.

The inverse function method was established by J. von Neumann and S. Ulam in 1947. According to the method, it is able to generate random numbers in accordance with an arbitrary density function from uniformed random numbers on the finite interval. In that year, they carried out computer simulation for tracing fission neutrons, and it was successful. Since the method utilizes an inverse function, it is called inverse function method. More precisely, the inverse function $\eta^{-1}(X)$ is used for generating uniformed $$\eta(X) = \int_C \rho(x) dx (C = \{u | -\infty \leq u \leq X\})$$

It has been turned out that random numbers having non-uniformed distribution on a bounded domain are available, as chaos theory have been developed recently. Chaotic dynamical mapping systems are getting more significant matters for random number generation.

Recurrence formula is usually applicable to the random number generation. In this case, a rational map is often used as the recurrence formula which generates ideally chaotic sequences. The rational map there is a result of the addition theorem of an elliptic function (including a trigonometric function). The random number generation by such the method has the following advantages.

(1) Non-cyclical random number sequence generation by which the numbers are proven to be chaotic (without some exceptions).

(2) According to sensitivity to initial conditions of chaos, completely different random number sequences are available just by slightly changing the seeds (the initial values to be applied to the recurrence formula).

(3) Known analytic function acts as the density function expressing random number distribution.

Known maps which bring the above advantages are: an Ulam-von Neumann map, a cubic map, a quintic map, and the like.

Ulam-von Neumann Map: $f(x) = 4x(1-x)$
Cubic Map: $f(x) = x(3-4x)^2$
Quintic Map: $f(x) = x(5-20x+16x^2)^2$ Regardless of the different maps above, $\rho(x) = 1/(\pi(x(1-x))^{1/2})$ represents a density function expressing distribution of a random number sequence $x[i]$ ($i \geq 0$) ($x[0]$, $x[1]$, $x[2]$, ...) which results from the following recurrence formula:

$$x[i+1] = f(x[i]) \quad (i \geq 0)$$

Japanese Unexamined Patent Application KOKAI Publication No. H10-283344 by Umeno et al. discloses a technique for generating random numbers on a bounded domain with using those maps, and embodiments where the technique is applied to Monte Carlo numerical integration. The following references disclose theoretical backgrounds for the above described application.

S. M. Ulam and J. von Neumann, Bull. Math. Soc. 53 (1947) p1120.

R. L. Adler and T. J. Rivlin, Proc. Am. Math. Soc. 15 (1964) p794.

K. Umeno, Method of constructing exactly solvable chaos, Phys. Rev. E (1997) vol. 55, pp. 5280–5284.

The above conventional technique, however, includes the following problems.

Monte Carlo numerical integration on unbounded domain requires random numbers which are distributed in the unbounded domain in accordance with a density function given by a known analytic function. Therefore, obtained uniform random numbers must be converted into the random numbers distributed in the unbounded domain. To obtain random numbers distributed in accordance with a desired density function with using the aforementioned von Neuman's inverse function method, an integral function of the density function must be obtained first, and then, an inverse function of the integral function must be obtained.

However, it is almost impossible to analytically integrate the density function. Moreover, approximation and calculation time accompanying to numerical calculation must be considered seriously when obtaining the inverse function of the integral function resulting from the density function. Since the Monte Carlo method requires the great number of random numbers, it is a hard task to calculate the integral with using the Monte Carlo method by the inverse function method.

The numerical integration in a unbounded domain is also required for solving the Black-Scholes equation for stock option pricing based on the data of stock prices. If integration on a unbounded domain is useful for solving the Black-Scholes equation.

It has been turned out, however, that density function expressing actual distribution of stock price fluctuation shows power-law behavior (R. N. Mantegna and H. E. Stanley, Nature, vol. 376, pp. 46–49, 1995). Integral of such the density function showing the power-law behavior can not be expressed by elementary functions. Therefore, it is very difficult to solve the stock price fluctuation with using the Monte Carlo integration on an unbounded domain based on known uniform random numbers.

Such the problems also appear in evaluation of communication traffic or interference noises in CDMA showing power-law behavior in transmission time distribution or in background noise distribution respectively.

The application of process to efficient computation of multiple integral on a unbounded domain has recently been attracting attention in industry fields.

It is an object of the present invention to provide an apparatus and a method for computing multiple integral, and a recording medium storing a program for realizing the above, which are suitable for high speed numerical integration of integrands which are defined over a multi-dimensional unbounded domain.

SUMMARY OF THE INVENTION

The invention for achieving the above object will now be disclosed in accordance with the principal of the present invention.

An apparatus for computing multiple integral according to a first aspect of the present invention computes multiple integral represented by a multidimensional integrand function A to be integrated with using a vector map f. The vector map f has an unbounded support, and converts an m ($m \geq 1$)-dimensional vector having a real number components into an m-dimensional vector having real number components. A multidimensional density function p for the limiting distribution resulting from repeatedly applying the map f to an m-dimensional vector u is analytically solvable. apparatus. Components and operations of the computing apparatus will now be described with reference to FIG. 1.

A computing apparatus comprises a first storage unit, a second storage unit, a first computing unit, a second computing unit, an update unit, and an output unit.

The first storage unit stores an m-dimensional vector $x=(x_1, x_2, \ldots, x_m)$.

The second storage unit stores a scalar value w.

The first computing unit which computes a vector $x'=f(x)=(x'_1, x'_2, \ldots, x'_m)$ resulting from applying the vector map f to the vector x being stored in the first storage unit.

The second computing unit which computes a scalar value $w'=A(x)/\rho(x)$ based on the vector x being stored in the first storage unit and the scalar value w being stored in the second storage unit.

The update unit updates the value stored in the first storage unit by storing the vector x' computed by the first computing unit on the first storage unit, and updates the value in the second storage unit by adding the scalar value w' computed by the second computing unit on the second storage unit.

The output unit which computes a scalar value $s=w/(c+1)$ based on the scalar value w being stored in the second storage unit when the number of update times by the update unit becomes c ($c \geq 1$), and outputs the scalar value s as a numerical result of the multiple integral.

The present invention is based on the following ergodic property over multidimensional unbounded domain M:

$$\int_M A(x)dx = \int_M (A(x)/\rho(x)) \cdot \rho(x) dx = (1/N) \cdot \Sigma_{j=1}^N A(X[j])/\rho(X[j]) \ (N \to \infty);$$

$$X[j+1] = f(X[j]) \ (j \geq 0);$$

In this case, computation errors are in the order of $(1/N)^{1/2}$ regardless of the number of dimensions m even at worst. Here, N is the updating time given by c+1. According to the latest study by the inventor (K. Umeno "Chaotic Monte Carlo Computation: a Dynamical Effect of Random-Number Generations", Japanese Journal of Applied Physics, March 2000), it has been clarified that the computation errors can be in the order of 1/N regardless of the number of dimensions m if a condition called Super-efficiency is satisfied. Therefore, faster integration is available.

In the computing apparatus, the scalar value stored in the second storage unit first may be a result from dividing a value resulting from applying the function A to the m-dimensional vector stored in the first storage unit first by a value resulting from applying the density function p to the m-dimensional vector stored in the first storage unit first.

In the computing apparatus, the scalar value stored in the second storage unit first may be 0, and the output unit may compute a scalar value $s'=w/c$, and outputs the scalar value s' as the numerical result of the multiple integral instead of the scalar value s.

The computing apparatus may further comprise a convergence rate obtainer, a vector map selector, and an output controller.

The convergence rate obtainer may obtain convergence rate of scalar values sequentially output by the output unit while varying the number of update times c for each of plural vector maps $g_1, g_2, \ldots, g_k$ ($k \geq 2$) which are prepared as the vector map f.

The vector map selector may refer to the convergence rates obtained by the convergence rate obtainer, and select a vector map $g_h$ ($1 \leq h \leq k$) which shows fastest convergence rate.

The output controller may control the output unit to output the scalar value with using the vector map $g_h$ as the vector map f and the number of update times c' (c'>c) instead of the number of update times c.

limiting distribution of a vector sequence u, f(u), f(f(u)), f(f(f(u))), ...

resulting from applying the vector map f to a predetermined m-dimensional vector $u=(u_1, u_2, \ldots, u_m)$ for equal to or greater than 0 times, may satisfy the following property of:

$$\rho(u) = \Pi_{i=0}^m \rho_i(u_i);$$

$$\rho_i(u_i) \sim c_{-i}|u_i|^{-(1+a)} \text{ for } u_i \to -\infty;$$

$$\rho_i(u_i) \sim c_{+i}|u_i|^{-(1+a)} \text{ for } u_i \to +\infty;$$

(a>0, $1 \leq i \leq m$, $c_{-i}>0$, $c_{+i}>0$)

In the computing apparatus, the vector map f may be defined as $$f(u) = (f_1(u_1), f_2(u_s), \ldots, f_m(u_m))$$

by a function $f_i(t) = g_i(d_i \ t)/d_i$ ($d_i > 0$) which is defined in $1 \leq i \leq m$, and the map $g_i$ may be defined by any one of the following maps $\phi_j$ ($1 \leq j \leq 8$) and a natural number $n_i$ ($n_i \geq 2$), as follows:

$g_i(\phi_j(\theta)) = \phi_j(n_i\theta)$;

$\phi_1(\theta) = -\text{sgn}(\tan \theta)/|\tan \theta|^{1/a}$;

$\phi_2(\theta) = -\text{sgn}(\tan \theta) \times |\tan \theta|^{1/a}$;
$\phi_3(\theta) = -\text{sgn}(\cos \theta)/|\tan \theta|^{1/a}$;
$\phi_4(\theta) = -\text{sgn}(\cos \theta) \times |\tan \theta|^{1/a}$;
$\phi_5(\theta) = \text{sgn}(\cos \theta)/|\tan \theta|^{1/a}$;
$\phi_6(\theta) = \text{sgn}(\cos \theta) \times |\tan \theta|^{1/a}$;
$\phi_7(\theta) = \text{sgn}(\sin \theta)/|\tan \theta|^{1/a}$;
$\phi_8(\theta) = \text{sgn}(\sin \theta) \times |\tan \theta|^{1/a}$;
sgn(t)=1 for t>0;
sgn(t)=0 for t=0;
sgn(t)=−1 for t<0

The computing apparatus may comprise a convergence rate obtainer, a positive

The convergence rate obtainer may define the map f for each of plural positive numbers $q_1, q_2, \ldots, q_k$ ($k \geq 2$) prepared as an invariable a, and obtain convergence rates of the scalar values sequentially output by the output unit while varying the number of update times c.

The positive number selector may refer the convergence rates obtained by the convergence rate obtainer, and select a positive number $q_h$ ($1 \leq h \leq k$) which shows the fastest convergence rate.

The output controller may define the map f with using the positive number $q_h$ as the invariable a, and control the output unit to output the scalar values with using the number of update times c' (c'>c) instead of the number of update times c.

The computing apparatus may comprise a convergence rate obtainer, a map selector, and an output controller.

The convergence rate obtainer may define the map $g_i$ with using plural ones of the maps $\phi_j$, and obtain convergence rates of the scalar values sequentially output by the output unit while varying the number of update times c.

The map selector may refer to the convergence rates obtained by the convergence rate obtainer, and select one of the maps $\phi_j$ which shows the fastest convergence rate.

The output controller may define the map $g_1$ with using the map $\phi_j$ selected by the map selector, and control the output unit to output the scalar values with using the number of update times c' (c'>c) instead of the number of update times c.

The computing apparatus may comprise a convergence rate obtainer, a natural number selector, and an output controller.

The convergence rate obtainer may define the map $g_i$ relating to each of plural natural numbers $p_1, p_2, \ldots, p_k$ ($k \geq 2$) as the natural numbers $n_i$, and obtain convergence rates of the scalar values sequentially output by the output unit while varying the number of update times c. convergence rate obtainer, and select a natural number $p_h$ ($1 \leq h \leq k$) which shows the fastest convergence rate.

The output controller may define the natural number map $g_i$ with using the natural number $p_h$ as the natural number $n_i$, and control the output unit to output the scalar values with using the number of update times c' (c'>c) instead of the number of update times c.

The output unit of the computing apparatus may compute the scalar value s each time the update unit carries out update, compare the latest scalar value s with the former scalar value which is computed at former update, and output the latest scalar value s if a result of the comparison satisfies a predetermined condition for terminating the computation.

A method for computing multiple integral according to a second aspect of the present invention computes multiple integral of a multidimensional integrand function A to be integrated with using a vector map f, a first storage unit which stores an m-dimensional vector $x=(x_1, x_2, \ldots x_m)$, and a second storage unit which stores a scalar value w.

The vector map f has an unbounded support, and converts m ($m \geq 1$)-dimensional vector having real number components into m-dimensional vector having real number components. A multidimensional density function $\rho$ for the limiting distribution resulting from repeatedly applying the map f to m-dimensional vector u is analytically solvable.

The computing method comprises the first computing step, the second computing step, the updating step, and the outputting step.

The first computing step computes a vector $x'=f(x)=(x'_1, x'_2, \ldots x'_m)$ resulting from applying the vector map f to the vector x being stored in the first storage unit.

The second computing step computes a scalar value $w'=A(x)/\rho(x)$ based on the vector x being stored in the first storage unit and the scalar value w being stored in the The updating step updates the value stored in the first storage unit by storing the vector x' computed by the first computing unit on the first storage unit, and updating the value in the second storage unit by adding the scalar value w' computed by the second computing unit to a value to be stored on the second storage unit.

The outputting step computes a scalar value s=w/(c+1) based on the scalar value w being stored in the second storage unit when the number of update times by the update unit becomes c ($c \geq 1$), and outputs the scalar value s as a numerial result of the multiple integral.

In the computing method, the scalar value stored in the second storage unit first may be a result from dividing a value resulting from applying the function A to the m-dimensional vector stored in the first storage unit first by a value resulting from applying the density function $\rho$ to the m-dimensional vector stored in the first storage unit first.

In the computing method, the scalar value stored in the second storage unit first may be 0, and the outputting step may compute a scalar value s'=w/c, and output the scalar value s' as the numerical result of the multiple integral instead of the scalar value s.

The computing method may further comprises the convergence rate obtaining step, and the vector map selecting step.

The convergence obtaining step may obtain convergence rate of scalar values sequentially output by the outputting step while varying the number of update times c for each of plural vector maps $g_1, g_2, \ldots, g_k$ ($k \geq 2$) which are prepared as the vector map f.

The vector map selecting step may refer to the convergence rates obtained by the convergence rate obtainer, and select a vector map $g_h$ ($1 \leq h \leq k$) which shows fastest convergence rate.

A vector map $g_h$ may be used as the vector map f.

The outputting step may output the scalar value with using the vector map $g_h$ as the times c.

In the computing method, a multidimensional density function $\rho$ representing the limiting distribution of a vector sequence u, f(u), f(f(u)), f(f(f(u))), ...

resulting from applying the vector map f to a predetermined m-dimensional vector $u=(u_1, u_2, \ldots, u_m)$ for equal to or greater than 0 times, may satisfy the following property of:

$\rho(u) = \Pi_{i=0}^{m} \rho_i(u_i)$;

$\rho_i(u_i) \sim c_{-i}|u_i|^{-(1+a)}$ for $u_i \to -\infty$;

$\rho_i(u_i) \sim c_{-i}|u_i|^{-(1+a)}$ for $u_i \to +\infty$;

(a>0, $1 \leq i \leq m$, $c_{-i}>0$, $c_{+i}>0$)

In the computing method, the vector map f may be defined as $$f(u)=(f_1(u_1), f_2(u_s), \ldots, f_m(u_m))$$

by a function $f_i(t)=g_i(d_i \cdot t)/d_i$ ($d_i>0$) which is defined in $1 \leq i \leq m$, and the map $g_i$ is defined by any one of the following maps $\phi_j$ ($1 \leq j \leq 8$) and a natural number $n_i$ ($n_i \geq 2$), as follows:

$g_i(\phi_j(\theta))=\phi_j(n_i\theta)$;
$\phi_1(\theta)=-\text{sgn}(\tan \theta)/|\tan \theta|^{1/a}$;
$\phi_2(\theta)=-\text{sgn}(\tan \theta)\times|\tan \theta|^{1/a}$;
$\phi_3(\theta)=-\text{sgn}(\cos \theta)/|\tan \theta|^{1/a}$;
$\phi_4(\theta)=-\text{sgn}(\cos \theta)\times|\tan \theta|^{1/a}$;
$\phi_5(\theta)=\text{sgn}(\cos \theta)/|\tan \theta|^{1/a}$;
$\phi_6(\theta)=\text{sgn}(\cos \theta)\times|\tan \theta|^{1/a}$;
$\phi_7(\theta)=\text{sgn}(\sin \theta)/|\tan \theta|^{1/a}$;
$\phi_8(\theta)=\text{sgn}(\sin \theta)\times|\tan \theta|^{1/a}$;
$\text{sgn}(t)=1$ for $t>0$;
$\text{sgn}(t)=0$ for $t=0$;
$\text{sgn}(t)=-1$ for $t<0$ The computing method may further comprise the convergence rate obtaining step, the positive number selecting step, and the output controlling step.

The convergence rate obtaining step may define the map f for each of plural positive numbers $q_1, q_2, \ldots, q_k$ ($k \geq 2$) prepared as an invariable a, and obtain convergence rates of the scalar values sequentially output by the output unit while varying the number of update times c.

The positive number selecting step may refer to the obtained convergence rates, and select a positive number $q_h$ ($1 \leq h \leq k$) which shows the fastest convergence rate.

The output controlling step may define the map f with using the positive number $q_h$ as the invariable a, and control output of the scalar values with using the number of update times c' (c'>c) instead of the number of update times c.

The computing method may further comprises the convergence rate obtaining step, the map selecting step, and the output control step.

The convergence rate obtaining step may define the map $g_i$ with using plural ones of the maps $\phi_j$, and obtain convergence rates of the scalar values sequentially output by the output step while varying the number of update times c.

The map selecting step may refer to the obtained convergence rates, and select one of the maps $\phi_j$ which shows the fastest convergence rate.

The output controlling step may define the map $g_i$ with using the selected map $\phi_j$ selected, and control output of the scalar values with using the number of update times c' (c'>c) instead of the number of update times c.

The computing method may further comprises the convergence rate obtaining step, the natural number selecting step, and the output controlling step.

The convergence rate obtaining step may define the map $g_i$ relating to each of plural natural numbers $\rho_1, \rho_2, \ldots, \rho_k$ ($k \geq 2$) as the natural numbers $n_i$, and obtain convergence rates of the scalar values sequentially output by the outputting step while varying the The natural number selecting step may refer to the obtained convergence rates, and select a natural number $\rho_h$ ($1 \leq h \leq k$) which shows the fastest convergence rate.

The output control step may define the natural number map $g_i$ with using the natural number $\rho_h$ as the natural number $n_i$, and control output of the scalar values with using the number of update times c' (c'>c) instead of the number of update times c.

In the computing method, the outputting step may compute the scalar value s each time the updating step carries out update, compares the latest scalar value s with the former scalar value which is computed at former update, and output the latest scalar value s if a result of the comparison satisfies a predetermined condition for terminating the computation.

A program for realizing the apparatus and method for computing multiple integral according to the present invention may be stored in a recording medium such as a compact disc, a floppy disk, a hard disk, a magneto-optical disk, a digital versatile disc, a magnetic tape, or a semiconductor memory.

The program stored in the recording medium according to the present invention may be executed by a data processor being equipped with a storage device, a computing unit, output device, and the like, such as a general purpose computer, a video game device, a PDA (Personal Data Assistants), and a cellular phone, to realize the above described apparatus and method for computing multiple integral.

The recording medium storing the program according to the present invention may be distributed or merchandized being separated from the data processor.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiments of the present invention will now be described. One skilled in the art may be able to propose modified embodiments each of which include all or some elements described in the following embodiments of the present invention. Such the modified embodiments will be included in the scope of the present invention, because the following embodiments of the present invention do not limit the scope of the present invention but just explain the present invention.

Figure 1:
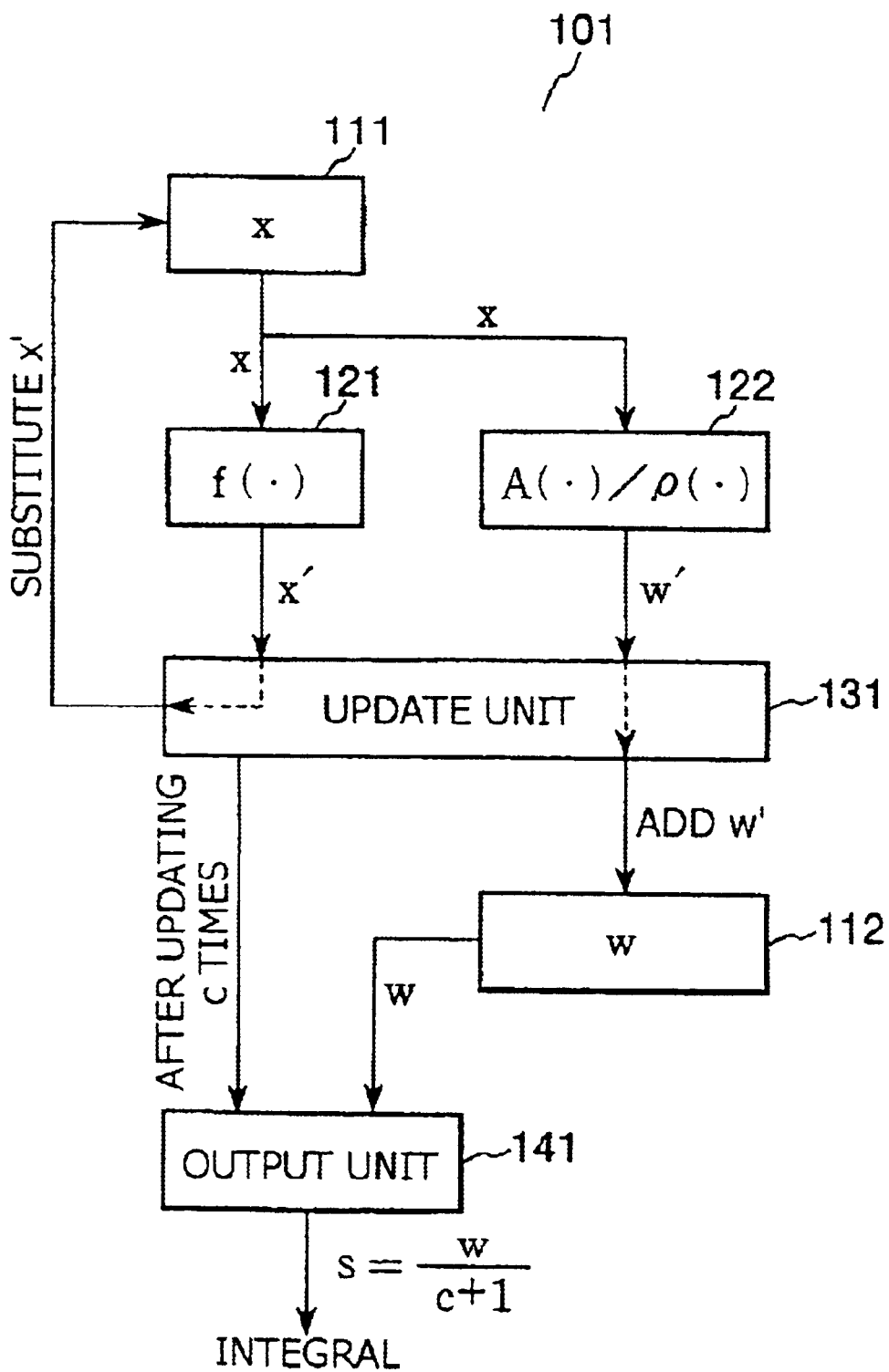
FIG. 1 is a schematic diagram showing the essential structure of an apparatus for FIG. 2 is a schematic diagram showing the essential structure of a data processor in which the apparatus for computing multiple integral according to the present invention is installed.
Figure 2:
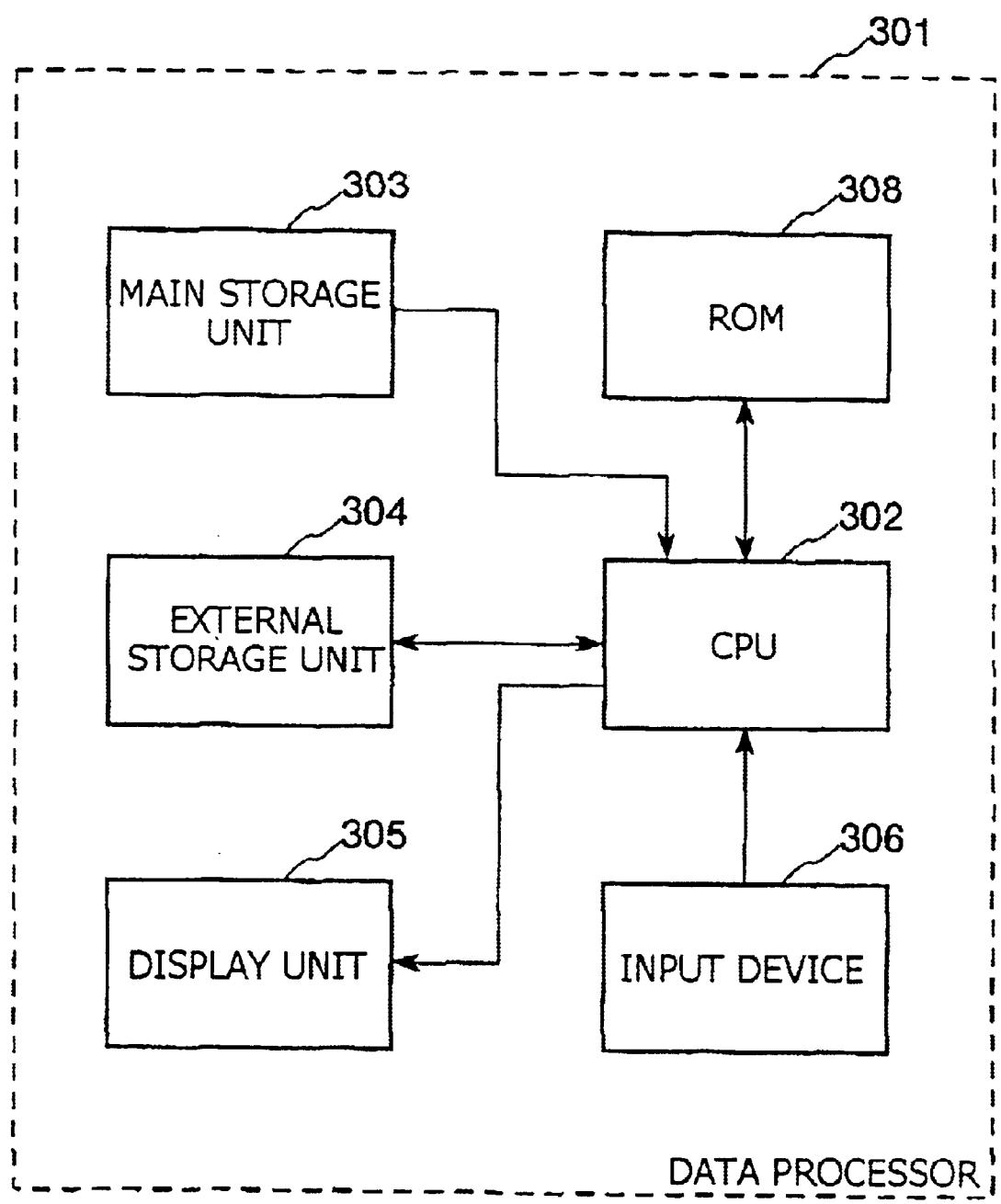

FIG. 2 is a schematic diagram showing the essential structure of a data processor such as a general purpose computer which realizes the apparatus for computing multiple integral according to the present invention. A first embodiment of the present invention will now be described with reference to FIG. 2.

A data processor 301 is controlled by a CPU (Central Processing Unit) 302. A main storage 303 such as RAM (Random Access Memory) temporarily holds data. An external storage 304 such as a hard disk, a floppy disk, a CD-ROM (Compact Disc Read Only Memory), a magnetic tape medium, and a magneto-optical disk stores programs to be executed by the CPU 302.

When the data processor 301 is booted, the CPU 302 executes an initial program loader (IPL) from ROM (Read Only Memory) 308. According to the execution of the IPL, programs relating to the operating system, application programs, and/or the like are loaded to the main storage 303 from the external storage 304 to be executed.

Results from execution of such the programs are stored on the external storage 304 as files or displayed on a display unit 305 such as a CRT (Cathode Ray Tube) display and a LCD (Liquid Crystal Display). A user of the data processor 301 operates input devices 306 such as a mouse and a keyboard to input instructions to the data processor 301.

The main storage 303 acts as the first storage unit and the second storage unit.

The CPU 302 is equipped with ALU (Arithmetric Logic Unit) and a coprocessor for numerical computation (not show) which act as the first and second computing unit.

The CPU 302 collaborates with the main storage 303 to act as the update unit and the output unit.

The external storage 304 acts as the recording medium storing a program according to the present invention.

Since those functions are realized by numerical computation and memory update as described below, the structure of the present invention can be realized by an electronic scope of the present invention includes such the modification.

Computing Process

Figure 3:
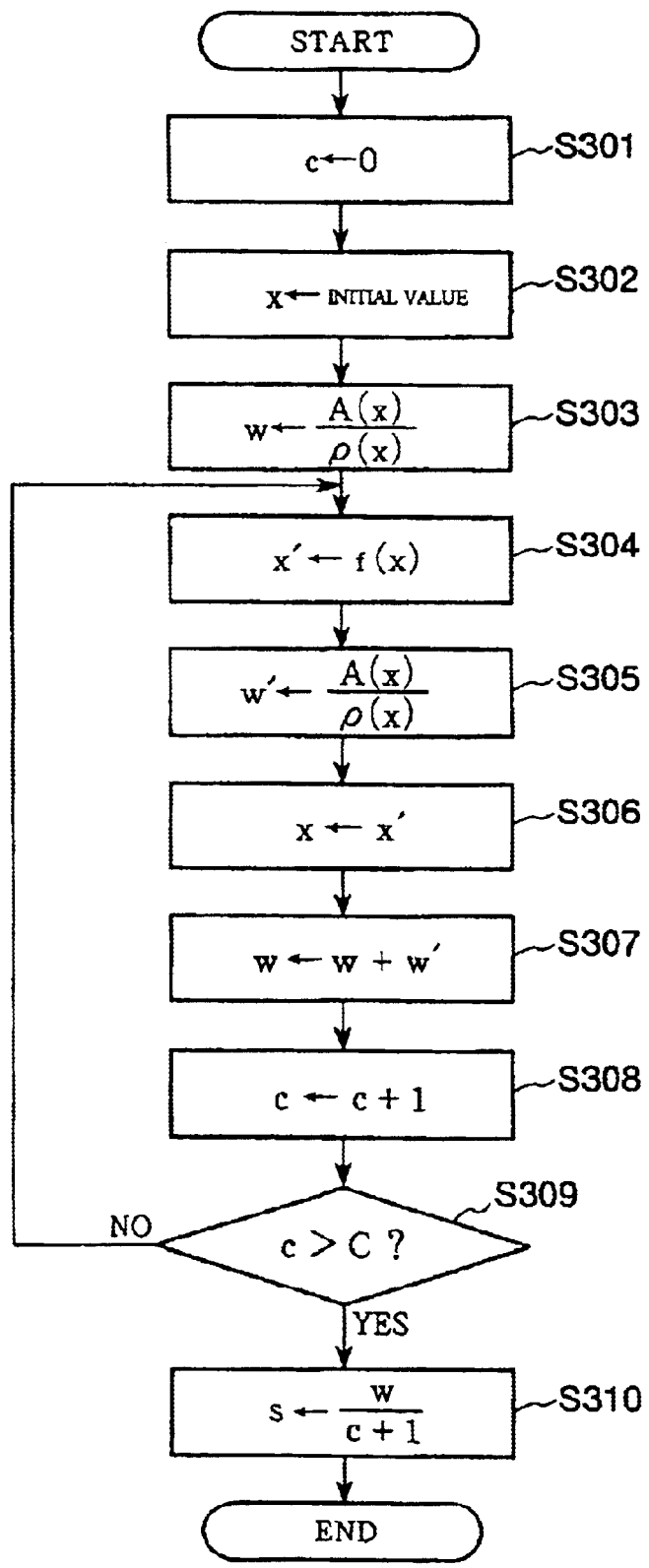
FIG. 3 is a flowchart showing the steps of the method of computing multiple integral according to the present invention.

FIG. 3 is a flowchart showing steps to be executed by the computing apparatus according to the present invention, that is, showing process flow of the steps in the computing method according to a first embodiment of the present invention.

The main storage 303 (typically, RAM) previously has an area for m-dimensional variable x (first storage unit), an area for scalar variable w (second storage unit), another areas for m-dimensional variable x' and for scalar variable w' which are prepared for temporary storage areas, an area for number of update times c, and an area for integration result variable s. Those areas will be denoted simply as variable x, variable w, variable x', variable w', variable c, and variable s respectively. And values to be stored in those areas will be denoted as x, w, x', w', c, and s respectively.

"A" denotes multidimensional integrand function to be integrated over an unbounded domain $M=(-\infty, +\infty) \times \ldots \times (-\infty, +\infty)$, "f" denotes vector chaotic map satisfying later-described conditions, and "$\rho$" denotes a density function of the the limiting distribution after applying the vector chaotic map f repeatedly.

The steps will now be described in detail with reference to FIG. 3. First, the CPU 302 stores a value 0 on the variable c (step S301).

Then the CPU 302 stores an arbitrary m-dimensional initial vector on the variable x (step S302).

The CPU 302 computes a scalar value $A(x)/\rho(x)$, and stores the result on the variable w (step S303).

The CPU 302 computes a vector value f(x), and stores the result on the variable x' (step S304).

The CPU 302 calculates the scalar value $A(x)/\rho(x)$, and stores the result on the variable w' (step S305).

The CPU 302 then updates the variable w by adding w' to the variable w (step S307).

The CPU 302 further updates the variable c by adding 1 to the variable c (step S308).

The CPU 302 determines whether c exceeds predetermined number of repeat times C or not (step S309). If c does not exceed C yet (step S309: No), the flow returns to step S304.

On the contrary, if c exceeds the predetermined number of repeat times C (step S309: Yes), the CPU 302 computes a scalar value w/(c+1), and stores the result on the variable s (step S310). And the process flow is terminated. "s" represents the numerical result of integration.

EXAMPLES OF VECTOR MAPS

Figure 4:
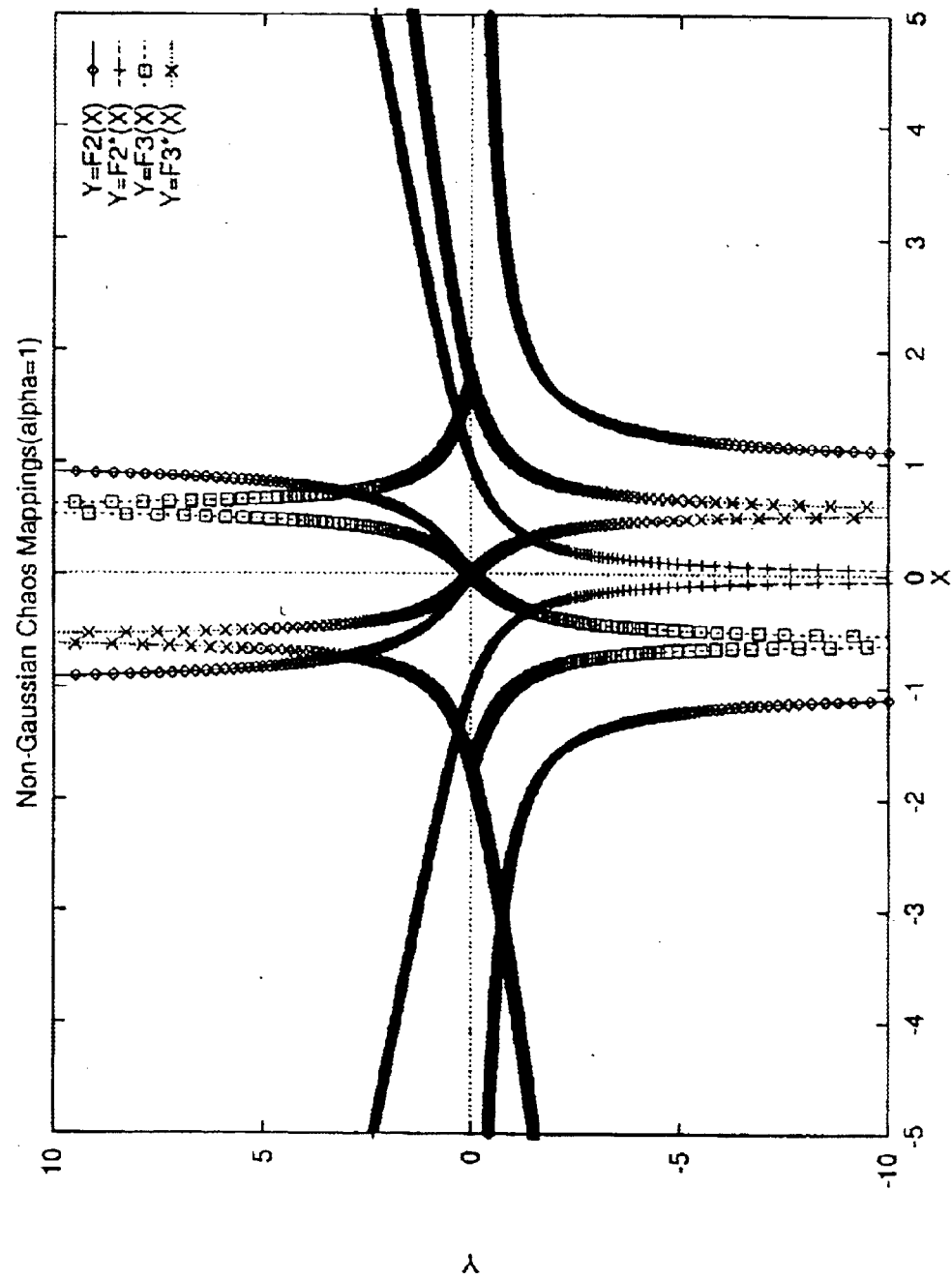
FIG. 4 is a graph exemplifying a map $f_i$ which defines a vector map f.

A vector map f being applicable to the present invention is:

$$f(u)=(f_1(u_1), f_2(u_2), \ldots, f_m(u_m))$$

where, m-dimensional vector $u=(u_1, u_2, \ldots, u_m)$, and map $f_1, f_2, \ldots, f_m$ FIG. 4 exemplifies maps $f_i$ ($1 \leq i \leq m$) which define a vector map f.

Each map $f_i$ is called as chaotic mapping. As aforementioned, those are available from n-multiplication formulas of a tangent function ($n \geq 2$). The inventor wrote the mathematical theorems and demonstrations for the above in:

Ken Umeno, Superposition of chaotic processes with convergence to Levy's stable law, Physical Review E, vol. 58 No. 2. The American Physical Society, August 1998.

F2(x) in FIG. 4 represents the map $f_1$ when parameters are n=2, d=1, and a=1, and $\phi_6$, is used.

F2*(x) in FIG. 4 represents the map $f_1$ when parameters are n=2, d=1, and a=1, and $\phi_5$ is used. is used.

F3*(x) in FIG. 4 represents the map $f_1$ when parameters are n=3, d=1, and a=1, and $\phi_5$ is used.

Explicit forms of those functions are available as follows.

Figure 5:
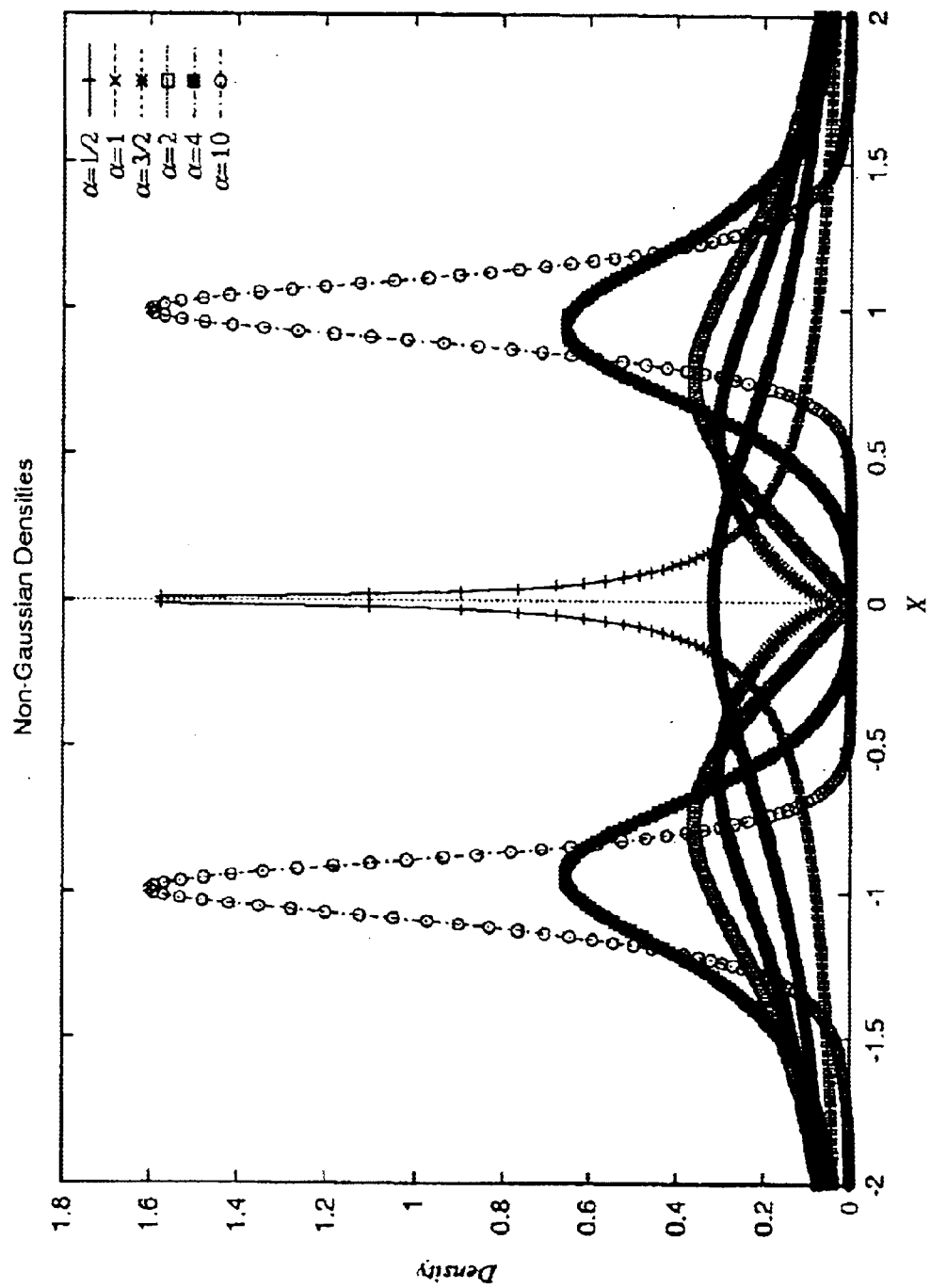
FIG. 5 is a graph showing a density function of the limiting distribution in a scalar sequence obtained by applying the map $f_i$ repeatedly.

$F2(x)=2|x|/(1-x^2)$ $F2^*(x)=\frac{1}{2}(|x|-1/|x|)$ $F3(x)=x|x^2-3|/(1-3x^2)$ $F3^*(x)=-x(x^2-3)/|(1-3x^2)|$ FIG. 5 shows densities obtained by a density function representing the limiting distribution of a scalar sequence t, $f_i(t), f_i(f_i(t)), f_i(f_i(f_i(t))), \ldots$ which is obtained by applying the map $f_i$ repeatedly.

FIG. 5 shows plotted density where a is varied while d is fixed to 1 in the density function ($\alpha$ represents a in FIG. 5). As mentioned in the above described writing, the density function is analytically solvable as:

$\rho(x)=ad^a|x|^{a-1}/(\pi(1+d^{2a}|x|^{2a}))$

It is obvious from FIG. 5 that shape of the density function ρ radically changes as a varies, regardless of n· and $\phi_j$.

Experiment Result 1

Figure 6:
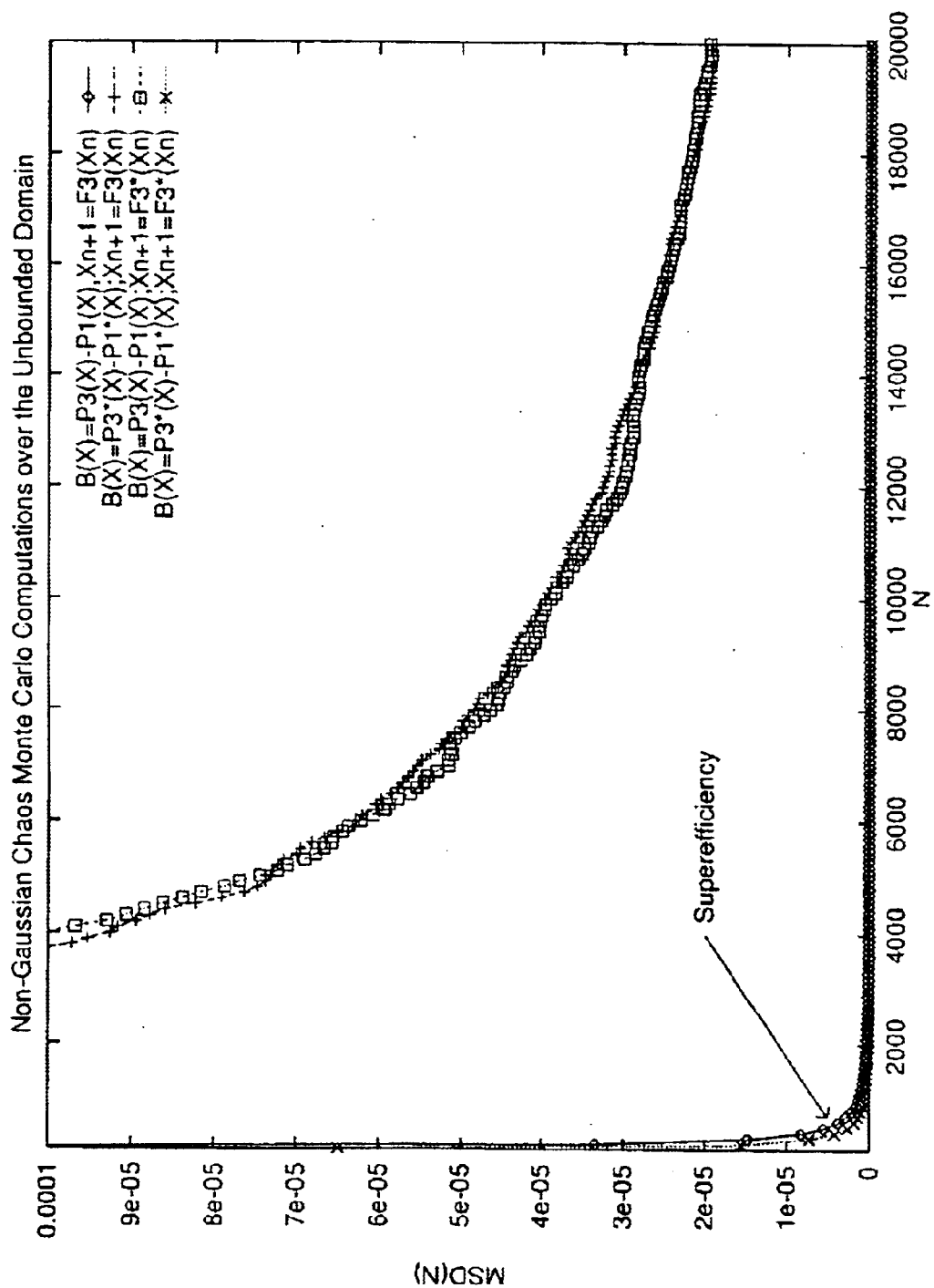
FIG. 6 is a graph showing means square of errors in computing steps where 1-dimensional integrand function to be numerically integrated in infinite domain ($-\infty, +\infty$)

FIG. 6 is a graph showing mean square deviation of computation error over the number of computing steps N=c+1 (c is the number of update times). In this case, the computation is to integrate 2 different 1-dimensional integrand functions (scalar maps) A(·), A'(·) to be integrated with using various chaotic maps $f_i$(P3(X)–P1(X) and P3*(X)–P1*(x) represent A(x) and A'(x) respectively in FIG. 6). The 1-dimensional integrand functions are expressed as follows:

$$A(x) = -4x^2 \text{sgn}(x)/(\pi(1+x^2)^{5/2});$$

$$A'(x) = -4|x| \text{sgn}(x)/(\pi(1+x^2)^{5/2})$$

integrand functions was carried out to obtain average errors after independent trials were carried out 1,000 times for each step number N.

Since it has been analytically known that the result will be 0 after integrating A(·) and A'(·) on the infinite domain (−∞, +∞), obtained result in the numerical integration will be the computation error.

Mean square deviation of errors radically decreases in $1/N^2$ order where N is the number of the steps, when F3(x) is applied to the integrand function A(·)ρ(·) and F3*(x) is applied to another integrand function A'(·)ρ(·) respectively.

On the other hand, decrease rate of the square deviation of errors is loosened when F3*(x) is applied to the integrand function A(·)ρ(·) and F3 (x) is applied to another integrand function A'(·)ρ(·) respectively, that is, the means square deviation decreases in 1/N order where N is the number of the steps.

In conclusion, faster convergence than ordinary Monte Carlo computation is available when the most suitable chaotic map is selected as a random number generator.

Experiment Result 2

Figure 7:
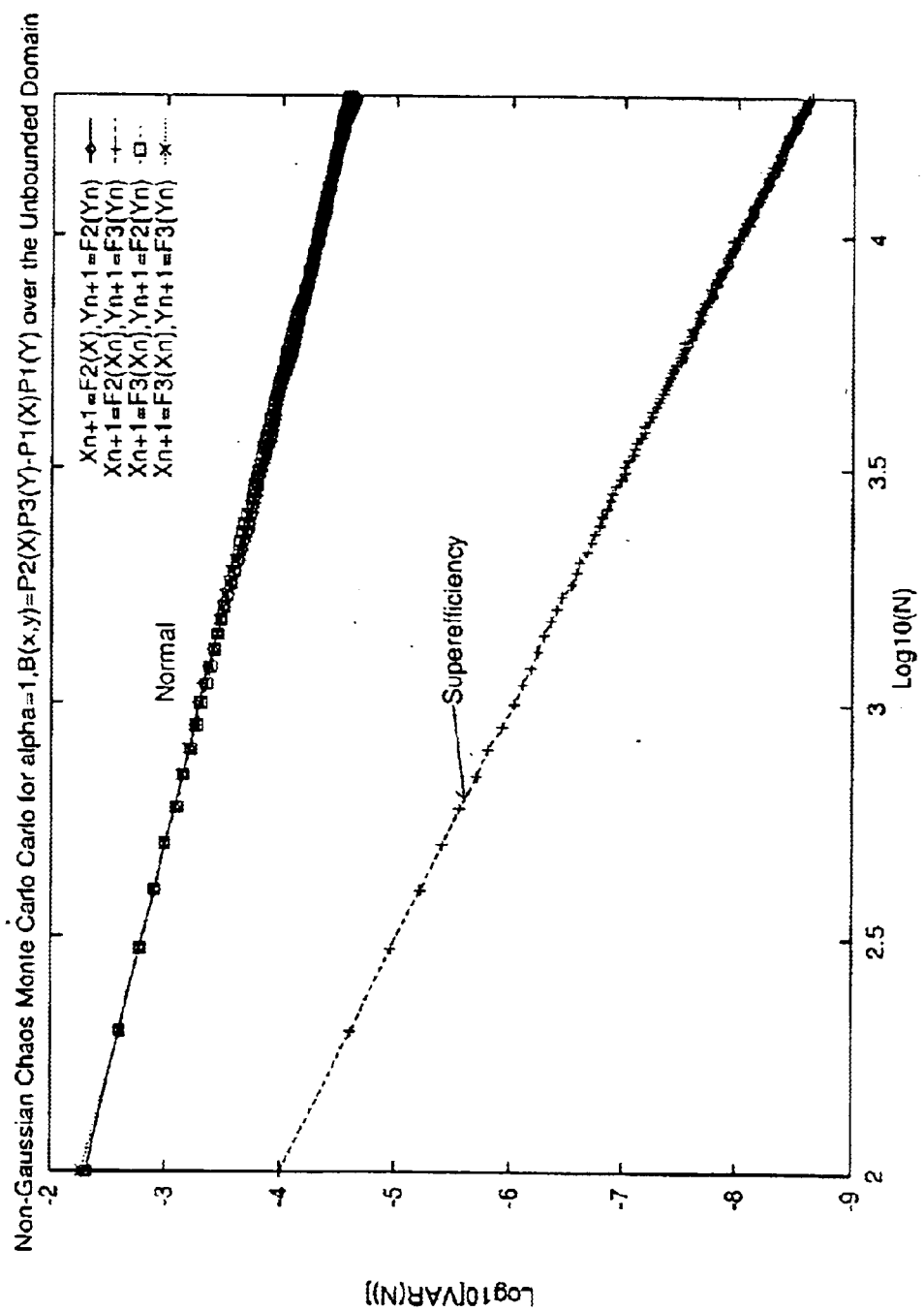
FIG. 7 is a graph showing mean square deviation of errors in computing steps where 2-dimensional function to be integrate is numerically integrated in unbounded domain ($-\infty, +\infty$)×($-\infty, +\infty$)

FIG. 7 is a graph showing mean square deviation of computation error over the number of computing steps N. In this case, the computation is to integrate 2-dimensional integrand function A(·,·) on 2-dimensional unbounded domain M=(−∞, +∞)×(−∞, +∞) by the technique of the present invention. The 2-dimensional function is expressed as follows:

$$A(x, y) = ((1-x^2)/(1+x^2))((1-3y^2)/(1+y^2)^{3/2})\text{sgn}(y)-\text{sgn}(x)$$
$$(1+x^2)^{1/2}|y|\text{sgn}(y)(y)(1+y^2)^{1/2}$$

FIG. 7 shows results of four cases where $(f_1, f_2)$=(F2, F2), (F2, F3), (F3, F2) or (F3, F3). As well as the experiment 1, average computation errors after carrying out independent trials 1,000 times for each step number N are obtained.

Since it has been analytically known that $\int_M A(x, y) dx dy = 0$, the result of numerical According to FIG. 7, of four cases, the case where F2(x) is selected as the map $f_1$ and F3(x) is selected as the map $f_2$ shows rapid decrease of the mean square deviation over the step numbers N. In this case the decrease rate is in $1/N^2$ order. Other cases show gentler decrease of the mean square deviation in the errors. In this case, the decrease rate is in 1/N order.

It is also obvious from the experiment result 2 that faster convergence of computation errors than ordinary Monte Carlo method is available by selecting a suitable chaotic map as the random number generator from various chaotic maps.

Instead of the chaotic map f described above, the following definition may be applicable to this embodiment.

$$f(u) = (f_1(u_1, u_2, \ldots, u_m), f_2(u_1, u_2, \ldots, u_m), \ldots, f_m(u_1, u_2, \ldots, u_m));$$

$$u = (u_1, u_2, \ldots, u_m)$$

The present invention is able to employ the above definition if random variable density in the limiting distribution of vector sequence resulting from applying f to predetermined vector repeatedly, has an explicit form.

In addition to the above described Ulam-von Neumann map, cubic map, and quintic map, Chebyshev map or generalized Chebyshev map is also applicable as $f_i$.

Second Embodiment

Figure 8:
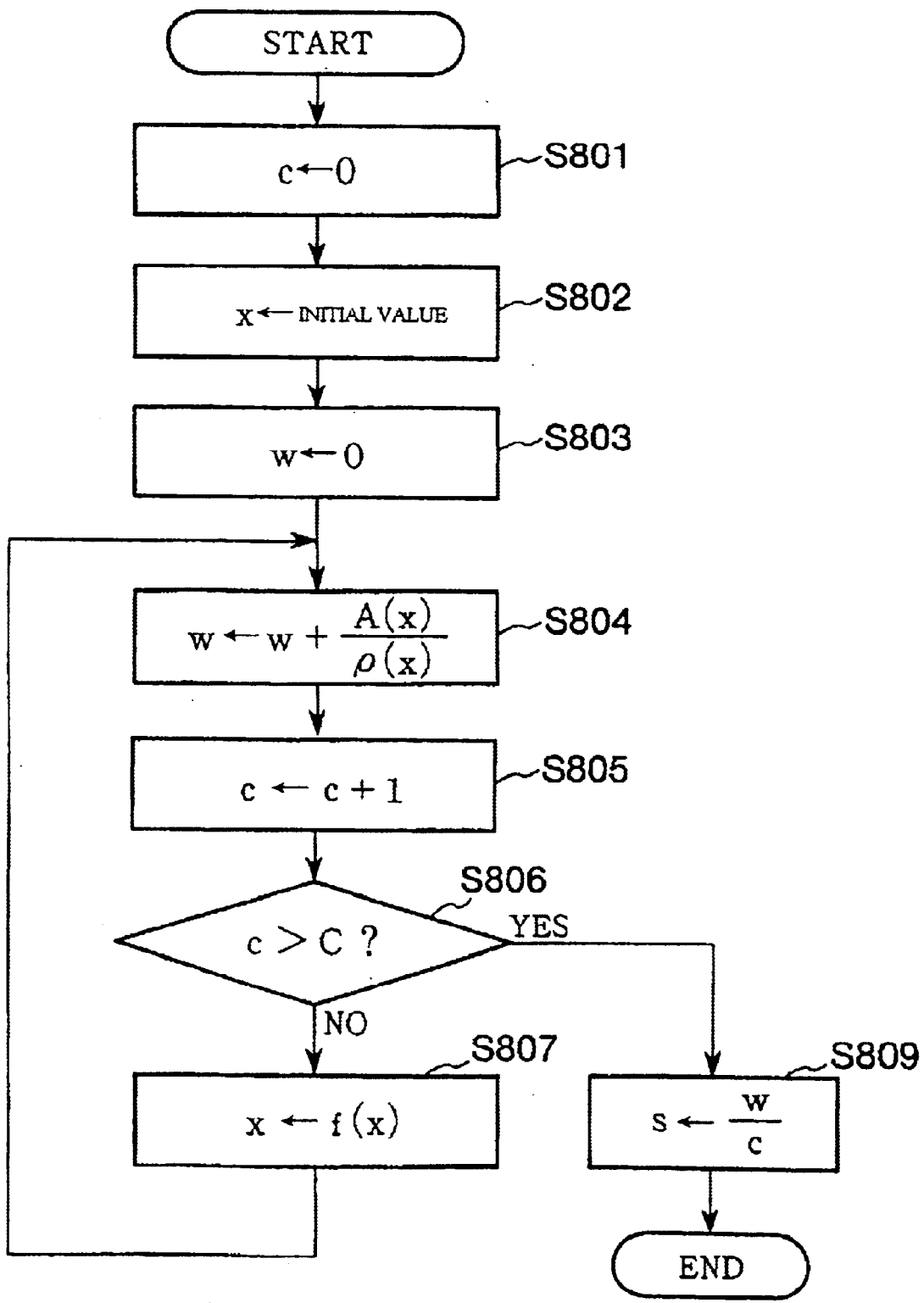
FIG. 8 is a flowchart showing steps of the method of computing multiple integral according to the present invention.

FIG. 8 is a flowchart showing steps to be executed by the computing apparatus according to the present invention, that is, showing process flow of the steps in the computing method according to a second embodiment of the present invention. Variables, maps, functions, and the like in the second embodiment are the same as those in the first embodiment.

The process flow will now be described with reference to FIG. 8. First, the CPU

Then the CPU 302 stores arbitrary m-dimensional initial vector on the variable x (step S802).

The CPU 302 stores 0 on the variable w (step S803).

The CPU 302 computes a scalar value A(x)/ρ(x), and updates the variable w by adding the resultant scalar value to the variable w (step S804).

The CPU 302 further updates the variable c by adding 1 to the variable c (step S805).

Then, the CPU 302 determines whether the variable c exceeds the number of repeat times C or not (step S806).

If the variable c does not exceed the number of repeat times C yet (step S806: No), the CPU 302 computes m-dimensional vector value f(x) with using the variable x and a vector map f, and stores the result on the variable x to update it (step S807), then the flow returns to step S804.

On the contrary, if the variable c exceeds the predetermined the number of repeat times C (step S806: Yes), the CPU 302 computes a scalar value w/c, and stores the result on the variable s (step S809). Then, the process flow is terminated. In this case, the variable s represents the result of integration.

The second embodiment features that required areas for storing variables are less than those required in the first embodiment.

Third Embodiment

As described above, if the chaotic map f shows a property called "Super-efficiency", faster error convergence is available by Monte Carlo computation. However, some integral function A have difficulties in selecting a suitable vector map f to show Super-efficiency. A third embodiment features automatically selection of the vector map.

Figure 9:
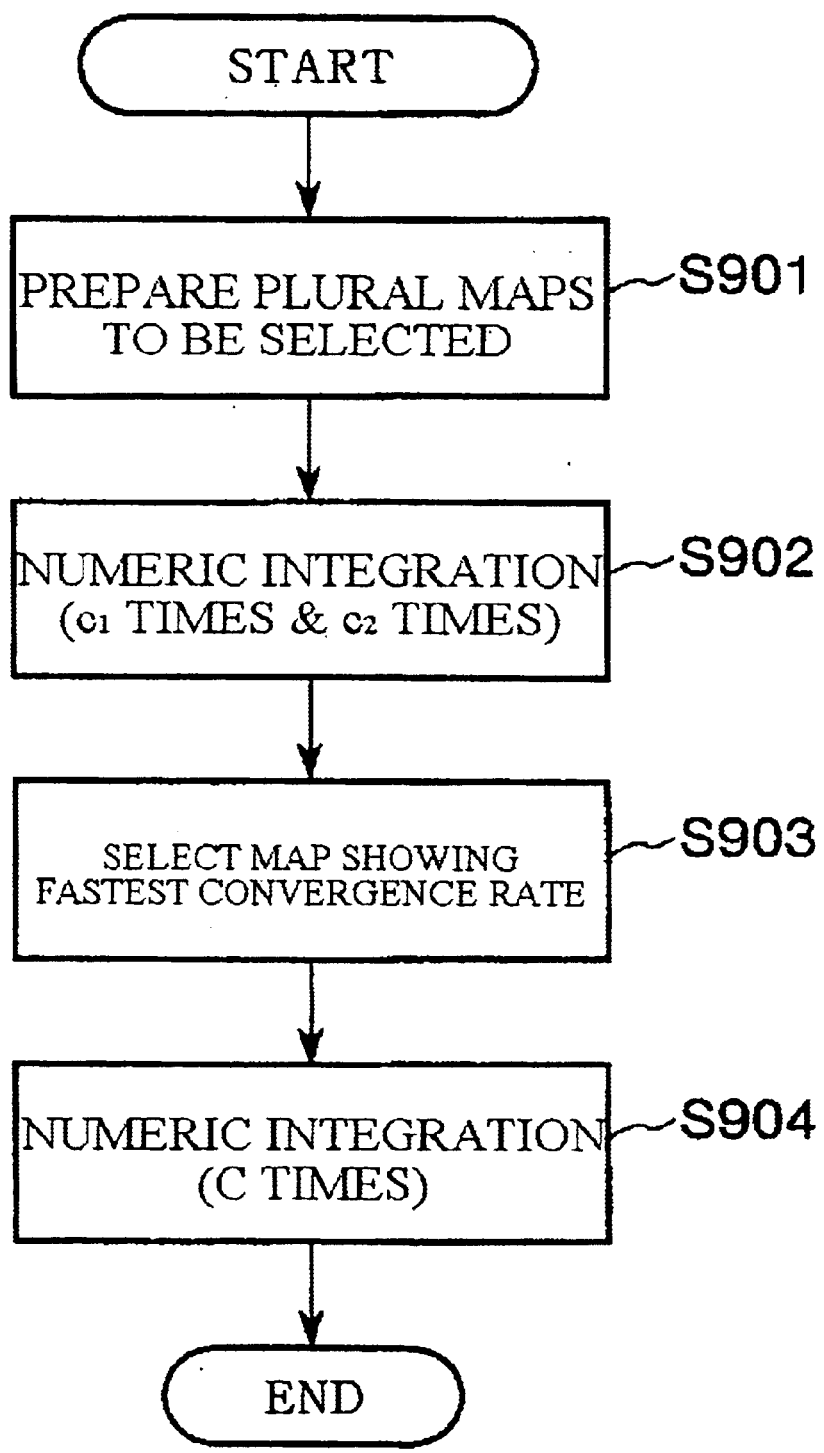
FIG. 9 is a flowchart showing steps of selecting a vector map according to the present invention.

FIG. 9 is a flowchart showing process flow for selecting steps of the vector map f.

Plural vector maps to be selected for numerical integration are prepared (step S901). different parameters are prepared as maps for computing components of a vector map f.

The above described method of multiple integral computing is applied to each of the prepared vector maps for predetermined times c1 and c2 (c1<c2), to obtain approximates of integration (step S902). This step is carried out for previously obtaining convergence by each map.

The obtained plural values resulting from the numerical integration are compared with each other to select a vector map which shows fastest convergence (step S903). The convergence rate may be determined by obtaining differences between the values after the numerical integration by computing c1 times and another values after the numerical integration by computing $c_2$ times, vector map by vector map. Of the vector maps, one having the least absolute value of the obtained difference, which means that it shows faster convergence, is selected.

Or, computing $c_2$ times may be omitted. In this case, a vector map which outputs a value closes to average of the obtained values after the numerical integration, should be selected.

Finally, the above described multiple integral computation is carried out over the selected vector map for C ($c_2$<C) times to obtain the numerical integration (step S904).

According to the third embodiment, a vector map which shows faster convergence is automatically selected even if it is unknown which vector map shows Super-efficiency for faster convergence, thus fast numerical integration is realized.

Fourth Embodiment

Monte Carlo method often requires predetermined number of random numbers (number of repeat times, number of update times according to the present invention) before computing numerical integration. The following fourth embodiment features that repeat of computation is stopped when the error becomes smaller than a predetermined value. time, . . . ) executed repeatedly as described in the second embodiment. Hereinafter, the resultant values will be represented as:

$$s_1, s_2, \ldots, s_1, \ldots$$

In the above described embodiments, the computation is terminated when the number of repeat times exceeds the predetermined number of update times C. In this embodiment, predetermined error rate $\epsilon$ and least number of repeat times L (L$\geq$2) are determined. And, a scalar value $s_1$ will be output as a result of numerical integration if the following condition for termination is satisfied:

$$i \geq L;$$

$$|s_i - s_{i-1}| \leq \epsilon |s_i|$$

Figure 10:
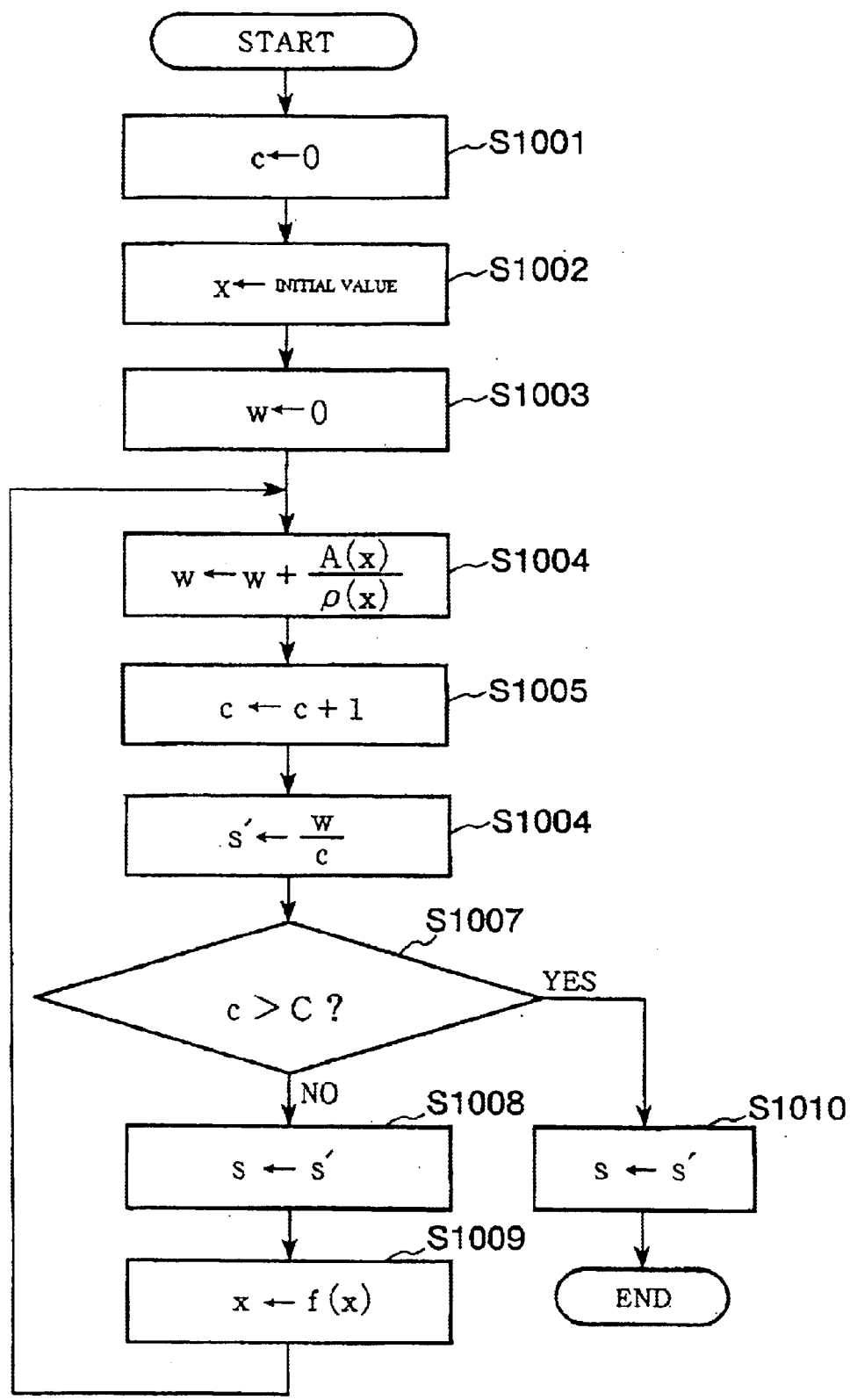
FIG. 10 is a flowchart showing steps of selecting a vector map according to the present invention.

FIG. 10 is a flowchart showing steps of computing numerical integration according to the fourth embodiment. Variables, maps, and functions in this embodiment are the same as those used in the above embodiments. Additionally, an area for storing a scalar variable s' is prepared in the main storage 303.

The process flow will now be described with reference to FIG. 10. The CPU 302 stores a value 0 on the variable c (step S1001).

Then the CPU 302 stores arbitrary m-dimensional initial vector on the variable x (step S1002).

The CPU 302 further stores 0 on the variable w (step S1003).

Then, the CPU 302 computes a scalar value A(x)/ρ(x) with using the value stored in the variable x, and adds the result to the variable w, thus the variable w is updated (step S1004).

The CPU 302 adds 1 to the variable c to update it (step S1005).

Then the CPU 302 computes a scalar value w/c, and stores the result on the variable s' (step S1006).

The CPU 302 determines whether the termination condition "$c \geq L \cap |s'-s| \leq |\epsilon s'|$" is If the condition is not satisfied (step S1007: No), the CPU 302 stores s' on the variable s to update it (step S1008), then, computes m-dimensional vector value f(x) with using the variable x and the vector map f, and stores the result on the variable x to update it (step S1009). The flow returns to step S1004.

On the contrary, if the condition is satisfied (step S1007: Yes), the CPU 302 stores the value s' on the variable s (step S1010), and the process flow is terminated. In this case, the value s represents the result of the integration.

Arbitrary desired value may be applicable to the error rate $\epsilon$, for example, 0.01 (1%) or 0.001 (0.1%).

The least number of repeat times L may depend on available computing time or type of the integral function A. The least number of repeat times L may be, for example, in a range of 100 to 1,000 times.

Or, the following example may be applicable to this embodiment. If the termination condition is satisfied successively k times (for example, 2 to 50 times) in the computing loop, that is:

$$i+k \geq L;$$

$$|s_{i+1} - s_i| \leq \epsilon |s_{i+1}|;$$

$$|s_{i+2} - s_{i+1}| \leq \epsilon |s_{i+2}|;$$

$$\sim \ldots ;$$

$$|s_{i+k} - s_{i+k-1}| \leq \epsilon |s_{i+k}|,$$

the repeat is terminated, and $s_{i+k}$ is output as the result of the numerical integration. Such the modification may be included in the scope of the present invention.

Fifth Embodiment

In the above embodiments, unbounded domain is represented as $(-\infty, +\infty) \times \ldots \times (-\infty, +\infty)$, and integral is obtained over whole domain. The following fifth embodiment discloses a technique for computing numerical integration over unbounded domain M $(0, +\infty) \times (0, +\infty)$; or $(0, 1) \times (-\infty, +\infty)$ To realize the computation over such the unbounded domain M, it may determine whether the updated vale of the variable x is included in the unbounded domain M or not, after step S807 described in the second embodiment. If the updated value is included in there, the flow may return to step S804. On the contrary, if the updated value is not included there, the flow may returns to step S805.

According to this modification, fast numerical integration over arbitrary unbounded domain M is also available as well as the above indicated embodiments.

According to the present invention as described above, it is able to provide an apparatus and a method for computing multiple integral, and a recording medium storing a program for realizing the apparatus and the method.

Those are applicable to various industrial fields such as risk evaluation in financial engineering, interference noise evaluation in CDMA technology for mobile communications or optical telecommunications technique, and traffic evaluation in telecommunications such as Internet.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-370277 filed on Dec. 27, 1999 and including specification, claims, drawings and summary. The disclosure of the above Japanese Patent Application is incorporated herein by reference in its entirety.

What is claimed is:

1. An apparatus for computing multiple integral of a multidimensional integrand function A to be integrated with using a vector mapping function f with unbounded support which converts an m (m≧1)-dimensional vector having real number components into another m-dimensional vector having real number components, by which a multidimensional density function p for a limiting distribution resulting from repeatedly applying the vector mapping function f to an m-dimensional vector u is analytically solvable, said apparatus comprising:

a first storage unit which stores an m-dimensional vector $x=(x_1, x_2, \ldots x_m)$;

a second storage unit which stores a scalar value w;

a first computing unit which computes a vector $x'=f(x)=(x'_1, x'_2, \ldots, x'_m)$ resulting from applying said vector map f to said vector x being stored in said first storage unit;

a second computing unit which computes a scalar value $w'=A(x)/\rho(x)$ based on said vector x being stored in said first storage unit;

an update unit which updates the value stored in said first storage unit by storing said vector x' computed by said first computing unit on said first storage unit, and updates the value in said second storage unit by adding said scalar value w' computed by said second computing unit to a value to be stored in said second storage unit; and an output unit which computes, when the number of update times by said update unit becomes c (c≧1), a scalar value $s=w/(c+1)$ based on said scalar value w being stored in said second storage unit when the number of update times by said update unit becomes c (c≧1), and outputs said scalar value s as a result of the multiple integral.

2. The apparatus according to claim 1, wherein said scalar value stored in said second storage unit first is a result from dividing a value resulting from applying said function A to said m-dimensional vector stored in said first storage unit first by a value resulting from applying said density function ρ to said m-dimensional vector stored in said first storage unit first.

3. The apparatus according to claim 1, wherein said scalar value stored in said second storage unit first is 0; and said output unit computes a scalar value $s'=w/c$, and outputs said scalar value s' as the result of the multiple integral instead of said scalar value s.

4. The apparatus according to claim 1 further comprising:

a convergence rate obtainer which obtains convergence rate of scalar values sequentially output by said output unit while varying said number of update times c for each of plural vector maps $g_1, g_2, \ldots, g_k$ (k≧2) which are prepared as said vector map f;

a vector map selector which refers to the convergence rates obtained by said convergence rate obtainer, and selects a vector map $g_h$ (1≦h≦k) which shows fastest convergence rate; and an output controller which controls said output unit to output said scalar value with using said vector map $g_h$ as said vector map f and the number of update times c' (c'>c) instead of said number of update times c.

5. The apparatus according to claim 1, wherein a multi-dimensional density function ρ representing the limiting distribution of a vector sequence u, f(u), f(f(u)), f(f(f(u))), . . .

resulting from applying said vector map f to a predetermined m-dimensional vector $u=(u_1, u_2, \ldots, u_m)$ for equal to or greater than 0 times, satisfies the following property of:

$\rho(v) = \Pi_{i=0}^{m} \rho_i(u_i)$;

$\rho_i(u_i) \sim c_{-i}|u_i|^{-(1+a)}$ for $u_i \to -\infty$;

$\rho_i(u_i) \sim c_{-i}|u_i|^{-(1+a)}$ for $u_i \to +\infty$;

$(a>0, 1\leq i\leq m, c_{-i}>0, c_{+i}>0)$.

6. The apparatus according to claim 5, wherein said vector map f is defined as $f(u)=(f_1(u_1), f_2(u_s), \ldots, f_m(u_m))$ by a function $f_i(t)=g_i(d_i t)/d$ ($d_i 0$) which is defined in 1≦i≦m and said map $g_i$ is defined by any one of the following maps $\phi_j(1\leq j\leq 8)$ and a natural number $n_i$ ($n_i\geq 2$), as follows:

$g_i(\phi_j(\theta))=\phi_j(n_i(\theta))$;

$\phi_1(\theta)=-\text{sgn}(\tan \theta)/|\tan \theta|^{1/a}$;

$\phi_2(\theta)=-\text{sgn}(\tan \theta)\times|\tan \theta|^{1/a}$;

$\phi_3(\theta)=-\text{sgn}(\cos \theta)/|\tan \theta|^{1/a}$;

$\phi_4(\theta)=-\text{sgn}(\cos \theta)\times|\tan \theta|^{1/a}$;

$\phi_5(\theta)=\text{sgn}(\cos \theta)/|\tan \theta|^{1/a}$;

$\phi_6(\theta)=\text{sgn}(\cos \theta)\times|\tan \theta|^{1/a}$;

$\phi_7(\theta)=\text{sgn}(\sin \theta)/|\tan \theta|^{1/a}$;

$\phi_8(\theta)=\text{sgn}(\sin \theta)\times|\tan \theta|^{1/a}$;

sgn(t)=1 for t>0;

sgn(t)=0 for t=0;

sgn(t)=−1 for t<0.

7. The apparatus according to claim 6 further comprising:

a convergence rate obtainer which defines said map $g_i$ with using plural ones of said maps $\phi_j$, and obtains convergence rates of the scalar values sequentially output by said output unit while varying said number of update times c;

a map selector which refers to the convergence rates obtained by said convergence rate obtainer, and selects one of said maps $\phi_j$ which shows the fastest convergence rate; and an output controller which defines said map $g_i$ with using said map $\phi_j$ selected by said map selector, and controls said output unit to output the scalar values with using the number of update times c' (c'>c) instead of said number of update times c.

8. The apparatus according to claim 6 further comprising:

a convergence rate obtainer which defines said map $g_i$ relating to each of plural natural numbers $P_1, P_2, \ldots, P_k$ (k≧2) as said natural numbers $n_i$, and obtains convergence rates of the scalar values sequentially output by said output unit while varying said number of update times c;

a natural number selector which refers to the convergence rates obtained by said convergence rate obtainer, and selects a natural number $P_h$ ($1 \leq h \leq k$) which shows the fastest convergence rate; and an output controller which defines said natural number map $g_i$ with using said natural number $P_h$ as said natural number $n_i$, and controls said output unit to output the scalar values with using the number of update times c' (c'>c) instead of said number of update times c.

9. The apparatus according to claim 5 further comprising:

a convergence rate obtainer which defines said map f for each of plural positive numbers $q_1, q_2, \ldots, q_k$ ($k \geq 2$) prepared as an invariable a, and obtains convergence rates of the scalar values sequentially output by said output unit while varying said number of update times c;

a positive number selector which refers the convergence rates obtained by said convergence rate obtainer, and selects an integer $q_h$ ($1 \leq h \leq k$) which shows the fastest convergence rate; and an output controller which defines said map f with using said positive number $q_h$, said invariable a, and controls said output unit to output said scalar values with using the number of update times c' (c'>c) instead of said number of update times c.

10. The apparatus according to claim 1, wherein said output unit computes said scalar value s each time said update unit carries out update, compares said latest scalar value s with the former scalar value which is computed at former update, and outputs said latest scalar value s if a result of the comparison satisfies a predetermined condition for terminating the computation.

11. A method for computing multiple integral of a multidimensional integrand function A to be integrated with using a vector mapping function f with unbounded support which converts an m ($m \geq 1$)-dimensional vector having real number components into another m-dimensional vector having real number components, by which a multidimensional density function ρ for a limiting distribution resulting from repeatedly applying the vector mapping function f to an m-dimensional vector a is analytically solvable, said method using a first storage unit which stores an m-dimensional vector x ($x_1, x_2, \ldots, x_m$), and a second storage unit which stores a scalar value w, said method comprising the steps of:

computing a vector $x'=f(x)=(x'_1, x'_2, \ldots, x'_m)$ resulting from applying said vector map f to said vector x being stored in said first storage unit;

computing a scalar value w'=A(x)/ρ(x) based on said vector x being stored in said first storage unit;

updating the value stored in said first storage unit by storing said vector x computed on said first storage unit, and updating the value in said second storage unit by adding said scalar value w computed to a value to be stored on said second storage unit; and computing, when the number of update times by said update unit becomes c ($c \geq 1$), a scalar value s=w/(c+1) based on said scalar value w being stored in said second storage unit when the number of update times by said update unit becomes c ($c \geq 1$), and outputting said scalar value s as a result of the multiple integral.

12. The method according to claim 11, wherein said scalar value stored in said second storage unit first is a result from dividing a value resulting from applying said function A to said m-dimensional vector stored in said first storage unit first by a value resulting from applying said density function ρ to said m-dimensional vector stored in said first storage unit first.

13. The method according to claim 11, wherein said scalar value stored in said second storage unit first is 0, and said outputting step computes a scalar value s'=w/c, and outputs said scalar value s' as the result of the multiple integral instead of said scalar value s.

14. The method according to claim 11 further comprising the steps of:

obtaining convergence rate of scalar values sequentially output by said outputting step while varying said number of update times c for each of plural vector maps $g_1, g_2, \ldots g_k$ ($k \geq 2$) which are prepared as said vector map f; and referring to the convergence rates obtained by said convergence rate obtainer, and selecting a vector map $g_h$ ($1 \leq h \leq k$) which shows fastest convergence rate, and said outputting step outputs said scalar value with using said vector map $g_h$ as said vector map f and the number of update times c' (c'>c) instead of said number of update times c.

15. The method according to claim 11, wherein a multidimensional density function ρ representing the limiting distribution of a vector sequence u, f(u), f(f(u)), f(f(f(u))), . . .

resulting from applying said vector map f to a predetermined m-dimensional vector u ($u_1, u_2, \ldots, u_m$) for equal to or greater than 0 times, satisfies the following property of:

$\rho(u) = \Pi_{i=0}^{m} \rho_i(u_i);$ $\rho_i(u_i) \sim c_{-i}|u_i|^{-(1+a)}$ for $u_i \to -\infty;$ $\rho_i(u_i) \sim c_{-i}|u_i|^{-(1+a)}$ for $u_i \to +\infty;$ (a>0, $1 \leq i \leq m$, $c_{-i} > 0$, $c_{+i} > 0$).

16. The method according to claim 15, wherein said vector map f is defined as $f(u) = (f_1(u_1), f_2(u_s), \ldots, f_m(u_m))$ by a function $f_i(t) = g_i(d_i \, t)/d_i$ ($d_i > 0$)) which is defined in $1 \leq i \leq m$, and said map $g_i$ is defined by any one of the following maps $\phi_j$ ($1 \leq j \leq 8$) and a natural number $n_i$, ($n_i \geq 2$) as follows:

$g_i(\phi_j(\theta)) = \phi_j(n_i \theta);$ $\phi_1(\theta) = -\text{sgn}(\tan \theta)/|\tan \theta|^{1/a};$ $\phi_2(\theta) = -\text{sgn}(\tan \theta) \times |\tan \theta|^{1/a};$ $\phi_3(\theta) = -\text{sgn}(\cos \theta)/|\tan \theta|^{1/a};$ $\phi_4(\theta) = -\text{sgn}(\cos \theta) \times |\tan \theta|^{1/a};$ $\phi_5(\theta) = \text{sgn}(\cos \theta)/|\tan \theta|^{1/a};$ $\phi_6(\theta) = \text{sgn}(\cos \theta) \times |\tan \theta|^{1/a};$ $\phi_7(\theta) = \text{sgn}(\sin \theta)/|\tan \theta|^{1/a};$ $\phi_8(\theta) = \text{sgn}(\sin \theta) \times |\tan \theta|^{1/a};$ sgn(t)=1 for t>0;

sgn(t)=0 for t=0;

sgn(t)=−1 for t<0.

17. The method according to claim 16 further comprising the steps of:

defining said map $g_i$ with using plural ones of said maps $\phi_j$, and obtaining convergence rates of the scalar values sequentially output by said output step while varying said number of update times c;

referring to the obtained convergence rates, and selecting one of said maps $\phi_j$ which shows the fastest convergence rate; and defining said map $g_i$ with using said selected map $\phi_j$ selected, and controlling output of the scalar values with using the number of update times c' (c'>c) instead of said number of update times c.

18. The method according to claim 16 further comprising the steps of:

defining said map $g_i$ relating to each of plural natural numbers $P_1, P_2, \ldots, P_k$ (k≧2) as said natural numbers $n_i$, and obtaining convergence rates of the scalar values sequentially output by said outputting step while varying said number of update times c;

referring to the obtained convergence rates, and selecting a natural number $P_h$ (1≦h≦k) which shows the fastest convergence rate; and defining said natural number map $g_i$ with using said natural number $P_h$, as said natural number $n_i$, and controlling output of the scalar values with using the number of update times c' (c'>c) instead of said number of update times c.

19. The method according to claim 15 further comprising the step of:

defining said map f for each of plural positive numbers $q_1$, $q_2, \ldots, q_k$ (k≧2) prepared as an invariable a, and obtaining convergence rates of the scalar values sequentially output by said output unit while varying said number of update times c;

referring to the obtained convergence rates, and selecting a positive number $q_h$ (1≦h≦k) which shows the fastest convergence rate; and defining said map f with using said positive number $q_h$ as said invariable a, and controlling output of said scalar values with using the number of update times c' (c'>c) instead of said number of update times c.

20. The method according to claim 11, wherein said outputting step computes said scalar value s each time said updating step caries out update, compares said latest scalar value s with the former scalar value which is computed at former update, and outputs said latest scalar value s if a result of the comparison satisfies a predetermined condition for terminating the computation.

21. A computer readable recording medium storing a program for computing multiple integral of a multidimensional integrand function A to be integrated with using a vector mapping function f with unbounded support which converts an m (m≧1)-dimensional vector having real number components into another m-dimensional vector having real number components, by which a multidimensional density function ρ for a limiting distribution resulting from repeatedly applying the vector mapping function f to an m-dimensional vector u is analytically solvable, said program comprising instructions for:

storing an m-dimensional vector $x=(x_1, x_2, \ldots, x_m)$ in a first storage unit;

storing a scalar value w in a second storage unit;

computing a vector $x'=f(x)=(x'_1, x'_2, \ldots x'_m)$, using a first computing unit, the vector x' resulting from applying said vector map f to said vector x being stored in said first storage unit;

computing a scalar value w'=A(x)/ρ(x), using a first computing unit, the scalar value w' based on said vector x being stored in said first storage unit;

updating the value stored in said first storage unit, using an update unit, by storing said vector x' computed by said first computing unit on said first storage unit, and updates the value in said second storage unit by adding said scalar value w' computed by said second computing unit to a value to be stored on said second storage unit; and computing a scalar value s=w/(c+1), when the number of update times by said update unit becomes c (c≧1), the scalar value s based on said scalar value w being stored in said second storage unit when the number of update times by said update unit becomes c (c≧1), and outputs said scalar values as a result of the multiple integral.

22. The recording medium according to claim 21, wherein said scalar value stored in said second storage unit first is a result from dividing a value resulting from applying said function A to said m-dimensional vector stored in said first storage unit first by a value resulting from applying said density function ρ to said m-dimensional vector stored in said first storage unit first.

23. The recording medium according to claim 21, wherein said scalar value stored in said second storage unit first is 0; and said output unit computes a scalar value s'=w/c, and outputs said scalar value s' as the result of the multiple integral instead of said scalar value s.

24. The recording medium according to claim 21, wherein said program further causes said computer to function as:

a convergence rate obtainer which obtains convergence rate of scalar values sequentially output by said output unit while varying said number of update times e for each of plural vector maps $g_1, g_2, \ldots, g_k$ (k≧2) which are prepared as said vector map t a vector map selector which refers to the convergence rates obtained by said convergence rate obtainer, and selects a vector map $g_h$ (1≦h≦k) which shows fastest convergence rate; and an output controller which controls said output unit to output said scalar value with using said vector map $g_h$, as said vector map f and the number of update times c' (c'>c) instead of said number of update times c.

25. The recording medium according to claim 21, wherein a multidimensional density function ρ representing the limiting distribution of a vector sequence u, f(u), f(f(u)), f(f(f(u))), resulting from applying said vector map f to a predetermined m-dimensional vector $u=(u_1, u_2, \ldots, u_m)$ for equal to or greater than 0 times, satisfies the following property of:

$\rho(u) = \Pi_{i=0}^{m} \rho_i(u_i);$ $\rho_i(u_i) \sim c_{-i}|u_i|^{-(1+a)}$ for $u_i \to -\infty;$ $\rho_i(u_i) \sim c_{-i}|u_i|^{-(1+a)}$ for $u_i \to +\infty;$ $(a>0, 1 \leq i \leq m, c_{-i}>0, c_{+i}>0).$ 26. The recording medium according to claim 25, wherein said vector map f is defined as:

$f(u) = (f_1(u_1), f_2(u_s), \ldots, f_m(u_m))$ by a function $f_i(t) = g_i(d_i \, t)/d_i$ ($d_i > 0$) which is defined in 1≦i≦m, and said map $g_i$ is defined by any one of the following maps $\phi_j$ ($1 \leq j \leq 8$) and a natural number $n_i$ ($n_i \geq 2$) as follows:

$g_i\phi_j(\theta)) = \phi_j(n_i, \theta)$;

$\phi_1(\theta) = -\text{sgn}(\tan \theta)/|\tan \theta|^{1/a}$;

$\phi_2(\theta) = -\text{sgn}(\tan \theta) \times |\tan \theta|^{1/a}$;

$\phi_3(\theta) = -\text{sgn}(\cos \theta)/|\tan \theta|^{1/a}$;

$\phi_4(\theta) = -\text{sgn}(\cos \theta) \times |\tan \theta|^{1/a}$;

$\phi_5(\theta) = \text{sgn}(\cos \theta)/|\tan \theta|^{1/a}$;

$\phi_6(\theta) = \text{sgn}(\cos \theta) \times |\tan \theta|^{1/a}$;

$\phi_7(\theta) = \text{sgn}(\sin \theta)/|\tan \theta|^{1/a}$;

$\phi_8(\theta) = \text{sgn}(\sin \theta) \times |\tan \theta|^{1/a}$;

$\text{sgn}(t) = 1$ for $t > 0$;

$\text{sgn}(t) = 0$ for $t = 0$;

$\text{sgn}(t) = -1$ for $t < 0$.

27. The recording medium according to claim 26, wherein said program further causes said computer to function as:

a convergence rate obtainer which defines said map $g_i$ with using plural ones of said maps $\phi_j$ and obtains convergence rates of the scalar values sequentially output by said output unit while varying said number of update times c;

a map selector which refers to the convergence rates obtained by said convergence rate obtainer, and selects one of said maps $\phi_j$ which shows the fastest convergence rate; and an output controller which defines said map $g_i$, with using said map $\phi_j$ selected by said map selector, and controls said output unit to output the scalar values with using the number of update times c' (c'>c) instead of said number of update times c.

28. The recording medium according to claim 26, wherein said program further causes said computer to function as:

a convergence rate obtainer which defines said map gi relating to each of plural natural numbers $P_1, P_2, \ldots, P_k$ ($k \geq 2$) as said natural numbers $n_i$, and obtains convergence rates of the scalar values sequentially output by said output unit while varying said number of update times c;

a natural number selector which refers to the convergence rates obtained by said convergence rate obtainer, and selects a natural number $P_h$ ($1 \leq h \leq k$) which shows the fastest convergence rate; and an output controller which defines said natural number map $g_i$ with using said natural number $P_h$ as said natural number $n_i$, and controls said output unit to output the scalar values with using the number of update times c' (c'>c) instead of said number of update times c.

29. The recording medium according to claim 25, wherein said program further causes said computer to function as:

a convergence rate obtainer which defines said map f for each of plural positive numbers $q_1, q_2, \ldots, q_k$ ($k \geq 2$) prepared as an invariable a, and obtains convergence rates of the scalar values sequentially output by said output unit while varying said number of update times c;

an integer selector which refers the convergence rates obtained by said convergence rate obtainer, and selects a positive number $q_h$ ($1 \leq h \leq k$) which shows the fastest convergence rate; and an output controller which defines said map f with using said positive number $q_h$, as said invariable a, and controls said output unit to output said scalar values with using the number of update times c' (c'>c) instead of said number of update times c.

30. The recording medium according to claim 21, wherein said output unit computes said scalar value s each time said update unit caries out update, compares said latest scalar value s with the former scalar value which is computed at former update, and outputs said latest scalar value s if a result of the comparison satisfies a predetermined condition for terminating the computation.

31. The recording medium according to claim 21, wherein said recording medium is a compact disc, a floppy disk, a hard disk, a magneto-optical disk, a digital versatile disc, a magnetic tape, or a semiconductor memory.

\* \* \* \* \*